United States Patent
Yamane et al.

(10) Patent No.: US 10,902,027 B2
(45) Date of Patent: Jan. 26, 2021

(54) GENERATION OF CATEGORY INFORMATION FOR MEASUREMENT VALUE

(71) Applicant: NEC Corporation, Tokyo (JP)

(72) Inventors: Masato Yamane, Tokyo (JP); Yuki Ashino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 376 days.

(21) Appl. No.: 15/753,647

(22) PCT Filed: Sep. 7, 2016

(86) PCT No.: PCT/JP2016/004071
§ 371 (c)(1),
(2) Date: Feb. 20, 2018

(87) PCT Pub. No.: WO2017/043075
PCT Pub. Date: Mar. 16, 2017

(65) Prior Publication Data
US 2020/0210454 A1    Jul. 2, 2020

(30) Foreign Application Priority Data

Sep. 10, 2015   (JP) .................................. 2015-178306

(51) Int. Cl.
*G06F 16/28* (2019.01)
*G06F 16/2455* (2019.01)
*H04L 29/06* (2006.01)

(52) U.S. Cl.
CPC ...... *G06F 16/285* (2019.01); *G06F 16/24565* (2019.01); *H04L 63/1425* (2013.01)

(58) Field of Classification Search
CPC ............ G06F 16/285; G06F 16/24565; H04L 63/1425
See application file for complete search history.

(56) References Cited

U.S. PATENT DOCUMENTS 7,788,722 B1   8/2010  Njemanze et al.
9,128,995 B1   9/2015  Fletcher et al.
(Continued)

FOREIGN PATENT DOCUMENTS

JP   2006-304108 A   11/2006
JP   2007-193436 A    8/2007
(Continued)

OTHER PUBLICATIONS

Japanese Office Action for JP Application No. 2015-178306 dated Sep. 27, 2016 with English Translation.
(Continued)

*Primary Examiner* — Scott A. Waldron

(57) ABSTRACT

A category information generating apparatus generates a measurement identifier of a measured value with respect to measurement information where the measured value for communication and a resource identifier of an apparatus generating the measured value are associated; extracts, when the resource identifier in the measurement information satisfies a condition regarding the resource identifier in extracted information where a condition for the resource identifier, an extraction item representing an item extracted from the measurement information when the condition is satisfied, and an extracted information identifier of the extraction item are associated, a particular measured value associated with the resource identifier; reads a value representing an extraction item in the extracted information from the particular measured value; and generates category information where a measurement identifier representing the particular measured value, the extracted information identifier in the extracted information, and the read value are associated.

10 Claims, 11 Drawing Sheets

| EXTRACTING INFORMATION STORAGE | | | 506 |
|---|---|---|---|
| EXTRACTED INFORMATION IDENTIFIER | CONDITION OF RESOURCE IDENTIFIER | EXTRACTION ITEM | |
| 1 | * | RESOURCE IDENTIFIER | |
| 2 | Pcap | PORT NUMBER | |
| 3 | Apache | MEASURED VALUE | |
| 4 | * | AS NUMBER | |
| 5 | * | TIME | |
| 6 | Apache | ADDRESS | |
| . . . | . . . | . . . | |

(56) References Cited

U.S. PATENT DOCUMENTS

| | | | |
|---|---|---|---|
| 9,516,053 B1* | 12/2016 | Muddu | G06N 5/022 |
| 2007/0168317 A1 | 7/2007 | Ikeyama | |
| 2009/0287768 A1 | 11/2009 | Tanaka | |
| 2013/0311509 A1* | 11/2013 | Sorkin | G06F 16/901 |
| | | | 707/769 |
| 2016/0197790 A1 | 7/2016 | Tsuchiya et al. | |
| 2017/0331930 A1* | 11/2017 | Shcherbakov | H04L 67/10 |

FOREIGN PATENT DOCUMENTS

| | | |
|---|---|---|
| JP | 5640166 B1 | 12/2014 |
| JP | 2015-121968 A | 7/2015 |
| WO | 2008/007669 A1 | 1/2008 |

OTHER PUBLICATIONS

International Search Report for PCT Application No. PCT/JP2016/004071, dated Oct. 4, 2016.
English translation of Written opinion for PCT Application No. PCT/JP2016/004071.
Anil Madhavapeddy et al, "Melange: Creating a "Functional" Internet" Computer Laboratory, University of Cambridge XenSource Inc. Arastra Inc., Mar. 21, 2007, pp. 101-114.
Monther Aldwairi et al., "Exscind: Fast Pattern Matching for Intrusion Detection Using Exclusion and Inclusion Filters" (Department of Network Engineering and Security Jordan University of Science and Technology Irbid, Jordan),Oct. 19, 2011, pp. 24-30.
Communication dated Jan. 30, 2019, from European Patent Office in counterpart application No. 16843942.0.

* cited by examiner

Fig.3

| ADDRESS | USER | DATE AND TIME WHEN PROCESS OF REQUEST IS COMPLETED | REQUEST | STATUS |
|---|---|---|---|---|
| 1.2.3.4 | A | 2015/9/3 13:30:26 | GET /xxx HTTP/1.0 | 200 |
| 1.2.5.6 | B | 2015/9/5 15:12:22 | POST /yyy HTTP/1.0 | 300 |
| ... | ... | ... | ... | ... |

Fig.4

| TIME | NAME AND PORT NUMBER OF FIRST APPARATUS | NAME AND PORT NUMBER OF SECOND APPARATUS |
|---|---|---|
| 10:56:21 | Client.1036 | Server.www |
| 10:56:22 | Server.www | Client.1036 |
| *** | *** | *** |

Fig.5

| TIME | RESOURCE IDENTIFIER | MEASURED VALUE |
|---|---|---|
| 13:30:26 | Apache | 1.2.3.4<br>A<br>2015/9/3 13:30:26<br>GET /xxx HTTP/1.0<br>200 |
| 10:56:21 | Pcap | 10:56:21<br>client.1036<br>Server.www |
| 15:12:22 | Apache | 1.2.5.6<br>B<br>2015/9/5 15:12:22<br>POST /yyy HTTP/1.0<br>300 |
| 10:56:22 | Pcap | 10:56:22<br>Server.www<br>client.1036 |
| ... | ... | ... |

Fig.6

EXTRACTING INFORMATION STORAGE 506

| EXTRACTED INFORMATION IDENTIFIER | CONDITION OF RESOURCE IDENTIFIER | EXTRACTION ITEM |
|---|---|---|
| 1 | * | RESOURCE IDENTIFIER |
| 2 | Pcap | PORT NUMBER |
| 3 | Apache | MEASURED VALUE |
| 4 | * | AS NUMBER |
| 5 | * | TIME |
| 6 | Apache | ADDRESS |
| ... | ... | ... |

Fig.7

| MEASUREMENT IDENTIFIER | EXTRACTED INFORMATION IDENTIFIER | VALUE OF EXTRACTION ITEM |
|---|---|---|
| 1 | 1 | Apache |
| 1 | 3 | 1.2.3.4··· |
| 1 | 4 | AS12345 |
| 2 | 1 | Pcap |
| 2 | 2 | 80 |
| 2 | 4 | AS21543 |
| 3 | 3 | 1.2.5.6··· |
| ··· | ··· | ··· |

Fig.10

| EXTRACTED INFORMATION IDENTIFIER | CONDITION |
|---|---|
| 5 | WITHIN ONE WEEK |
| 1 | Apache |
| 6 | PARTICULAR ADDRESS |
| ... | ... |

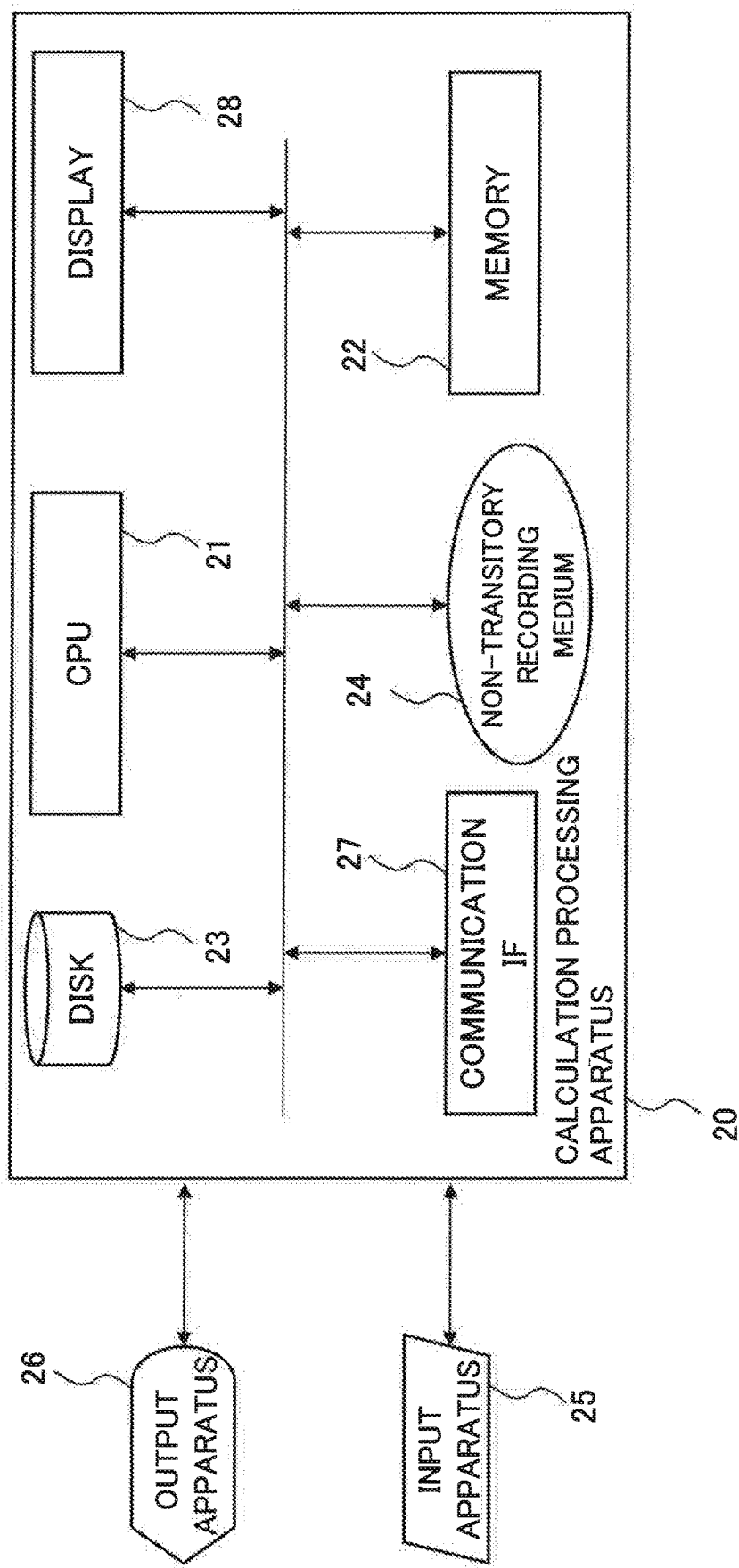

GENERATION OF CATEGORY INFORMATION FOR MEASUREMENT VALUE

This application is a National Stage Entry of PCT/JP2016/004071 filed on Sep. 7, 2016, which claims priority from Japanese Patent Application 2015-178306 filed on Sep. 10, 2015, the contents of all of which are incorporated herein by reference, in their entirety.

TECHNICAL FIELD

The present invention relates to a category information generating apparatus or the like which enables high-speed search processing and generates information.

BACKGROUND ART

Analysis of log information on communication executed at the communication network is a technology of detecting an unauthorized access via a communication network. In this case, the log information is not necessarily generated by one type of information processing apparatus and may include various types of log information generated by a plurality of information processing apparatus. For example, PTL 1 discloses an example of generating the log information. PTL 2 discloses an example of detecting a cyberattack based on the log information. PTL 3 discloses a technology for simplifying processing of comparing various types of log information. Hereinafter, the technologies disclosed in PTL 1 to PTL 3 are described.

A management apparatus disclosed in PTL 1 generates a request classification log in which the number of times of the request signal received via the communication network is classified for each predetermined time interval and for each type of the request. Further, the management apparatus generates a system log representing a used amount of resources at a server that processing the request for each of the predetermined time interval. The management apparatus calculates the used amount of the resources required for processing the request for each request on the based of the generated request classification log and the generated system log.

The log analysis apparatus disclosed in PTL 2 detects an attack that is at or before the detected attack and has not been undetected on the basis of an attack scenario representing the attack procedure assumed in the cyberattack. The log analysis apparatus determines whether or not the detected attack is suffered by analyzing the log on the computer system, and when the attack is suffered, the log analysis apparatus determines that detection missing of the attack has occurred.

A log summation support apparatus disclosed in PTL 3 collects pieces of log information including unauthorized communication records from a plurality of intrusion detection systems and stores the collected pieces of log information in a storage. The log summation support apparatus generates a working table in which log information having the same article value common to that of the log information and the log information are associated with each other among pieces of log information stored in the storage.

CITATION LIST

Patent Literature

PTL 1: International Publication No. WO 2008/007669
PTL 2: Japanese Laid-open Patent Publication No. 2015-121968
PTL 3: Japanese Laid-open Patent Publication No. 2006-304108

SUMMARY OF INVENTION

Technical Problem

However, even the log summation support apparatus disclosed in PTL 3 cannot always extract a desired communication effectively. This is because even when a plurality of request includes a certain search condition in common, each time the respective requests are received, processing on the certain search condition need to be repeated. In other words, the processing on the certain search the condition are repeated each time the respective requests are received.

One of main objects of the present invention is to provide a category information generating apparatus or the like which enables high-speed search processing of log information of a communication or the like.

Solution to Problem

In order to achieve the above-described object, as an aspect of the present invention, a category information generating apparatus including:

identifier generating means for generating a measurement identifier of a measured value with respect to measurement information where the measured value measured with respect to communication via a communication network and a resource identifier of an apparatus generating the measured value are associated with each other;

extracting means for extracting, when the resource identifier in the measurement information satisfies a condition regarding the resource identifier in extracted information where a condition for the resource identifier, an extraction item representing an item extracted from the measurement information when the condition is satisfied, and an extracted information identifier for identifying the extraction item are associated with each other, a particular measured value associated with the resource identifier from the measurement information;

reading means for reading a value representing an extraction item in the extracted information from the particular measured value; and category information generating means for generating category information where a measurement identifier representing the particular measured value, the extracted information identifier in the extracted information, and a value read by the reading means are associated with each other.

In addition, as another aspect of the present invention, a category information generating method including:

generating a measurement identifier of a measured value with respect to measurement information where the measured value measured with respect to communication via a communication network and a resource identifier of an apparatus generating the measured value are associated with each other;

extracting, when the resource identifier in the measurement information satisfies a condition regarding the resource identifier in extracted information where a condition for the resource identifier, an extraction item representing an item extracted from the measurement information when the condition is satisfied, and an extracted information identifier for identifying the extraction item are associated with each other, a particular measured value associated with the resource identifier from the measurement information;

reading a value representing an extraction item in the extracted information from the particular measured value; and generating category information where a measurement identifier representing the particular measured value, the extracted information identifier in the extracted information, and the read value are associated with each other.

Furthermore, the object is also realized by an associated category information generating program, and a computer-readable recording medium which records the program.

Advantageous Effects of Invention

According to the category information generating apparatus or the like of the present invention, it is possible to perform the high-speed search processing of the log information.

BRIEF DESCRIPTION OF DRAWINGS

FIG. 3 is a drawing conceptually illustrating one example of measurement information measured with respect to a communication executed in accordance with the HTTP protocol.

FIG. 4 is a drawing conceptually illustrating one example of measurement information generated by "tcpdump" command for capturing packet transmitted/received in a communication network.

FIG. 5 is a drawing conceptually illustrating an example of measurement information.

FIG. 6 is a drawing conceptually illustrating an example of extracted information referred to by the category information generating apparatus.

FIG. 7 is a drawing conceptually illustrating one example of category information generated by the category information generating apparatus.

FIG. 10 is a drawing conceptually illustrating one example of search information.

FIG. 11 is a block diagram schematically illustrating a hardware configuration of a calculation processing apparatus capable of realizing a category information generating apparatus or a searching apparatus according to each example embodiment of the present invention.

DESCRIPTION OF EMBODIMENTS

Next, example embodiments of the present invention will be described in detail with reference to the drawings.

First Example Embodiment

Figure 1:
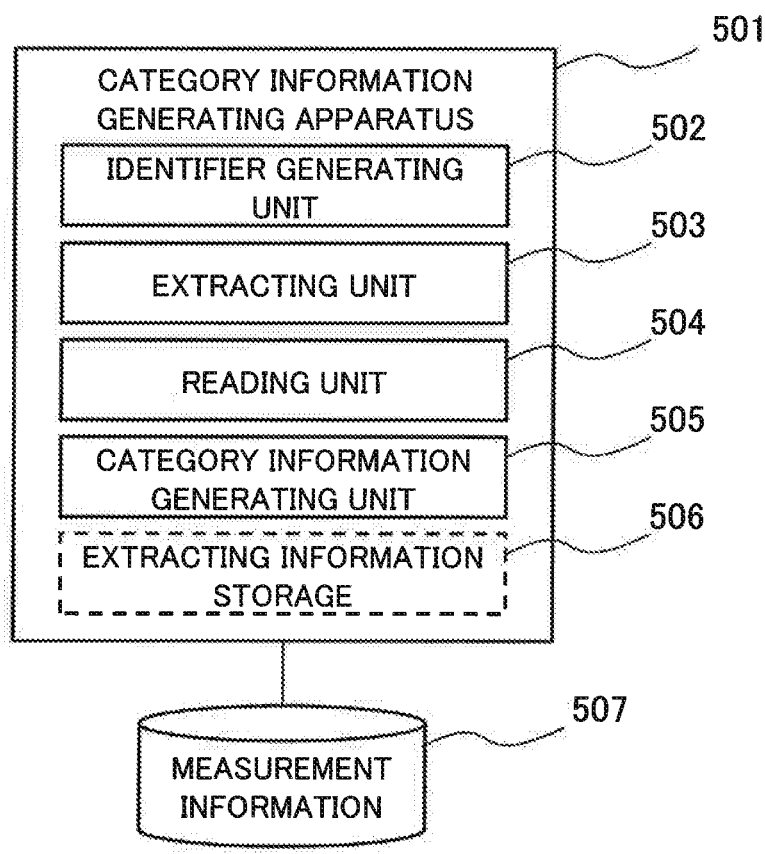
FIG. 1 is a block diagram illustrating a configuration of the category information generating apparatus according to a first example embodiment of the present invention.

A configuration of a category information generating apparatus 501 of the first example embodiment of the present invention will be described in details with reference to FIG. 1. FIG. 1 is a block diagram illustrating a configuration of the category information generating apparatus 501 according to the first example embodiment of the present invention.

The category information generating apparatus 501 according to the first example embodiment includes an identifier generating unit (identifier generator) 502, an extracting unit (extractor) 503, a reading unit (reader) 504, and a category information generating unit (category information generator) 505. The category information generating apparatus 501 may further include an extracting information storage 506. The extracting information storage 506 can store extracted information as exemplified in FIG. 6 (described later).

With reference to FIG. 3 and FIG. 4, measurement information which is a basis of generating the category information in the category information generating apparatus 501. Then, with reference to FIG. 6, the extracted information referred to by the category information generating apparatus 501 will be described. Thereafter, with reference to FIG. 2, processing of the category information generating apparatus 501 according to the first example embodiment of the present invention will be described.

First, with reference to FIG. 3 and FIG. 4, measurement information will be described. FIG. 3 is a drawing conceptually illustrating one example of measurement information measured with respect to the communication executed in accordance with the HTTP protocol in the communication network. FIG. 4 is a drawing conceptually illustrating one example of the measurement information generated by "tcpdump" command for capturing packet transmitted/received in the communication network. The HTTP is an abbreviation of the Hypertext Transfer Protocol.

With reference to FIG. 3, an address of the information processing apparatus transmitting the request, an identification information of a user transmitting the request, and the completion date and time of the processing on the request in the server, the request, and a server status (state) after the request are associated with one another in the measurement information. For example, in the measurement information, the address "1.2.3.4", the user "A", the date and time "2015/9/3_13:30:26", the request "GET_/xxx_HTTP/1.0", and the status "200" are associated. This represents that a user "A" transmits the request "GET_/xxx_HTTP/1.0" from the information processing apparatus identified by the address "1.2.3.4" to the server, and the server completes the processing for the request at the date and time "2015/9/3_13:30:26" in the status "200."

With respect to the communication executed via the communication network, with reference to FIG. 4, in the measurement information, a time when the communication is executed, names of apparatus (i.e., a first apparatus and a second apparatus) that execute the communication, and a port number gone through when the communication is executed are associated. For example, in the measurement information, the time "10:56:21," the name of the first apparatus "Client," the port number in the first apparatus "1036," the name of the second apparatus "Server," and the port number of the second apparatus "www" are associated. This represents that the communication is conducted at the time "10:56:21" between the port number "1036" of the apparatus named "Client" and the port number "www" of the apparatus named "Server".

Hereinafter, for convenience of descriptions, it is assumed that an apparatus generating (measuring) measurement information is represented as the "log generation apparatus" (resources). It is assumed that a plurality of log generation apparatus generate pieces of measurement information formatted differently as exemplified in FIG. 3 and FIG. 4. It is assumed that "Pcap" (packet_capture) is a resource identifier of a log generation apparatus that generates measurement information as exemplified in FIG. 4 using the "tcpdump" command. It is assumed that "Apache" is a resource identifier of a log generation apparatus that generates the measurement information (exemplified in FIG. 3) measured with respect to the communication in accordance with the HTTP protocol.

For convenience of descriptions, the log generation apparatus according to the present example embodiment may convert measurement information (log) with disunified format to a certain unified format (normalization processing). In this case, the log generation apparatus generates measurement information 507 (FIG. 5) with the unified format on the basis of a plurality of pieces of measurement information (for example, FIG. 3 and FIG. 4) with disunified format. FIG. 5 is a drawing conceptually illustrating an example of the measurement information 507.

With reference to FIG. 5, in the measurement information 507, a time of communication and a resource identifier of a log generation apparatus for measuring the measurement information 507 with respect to the communication, and a measured measurement value with respect to the communication (for example, address, user, request, and name, port number and the like of apparatus) are associated with each other. For example, in the measurement information 507 exemplified in FIG. 5, the time "13:30:26", the resource identifier "Apache", and the measured value "1.2.3.4 . . . " described in a measured value column are associated. This represents that the log generation apparatus identified by the resource identifier "Apache" generates the measured value "1.2.3.4 . . . " at the time "13:30:26".

The measurement information 507 does not necessarily need to include all items described with reference to FIG. 3 to FIG. 5. In other words, the measurement information 507 is not limited to the above-described example. Hereinafter, for convenience of descriptions, it is assumed that the measurement information 507 is described in accordance with a certain unified format. However, processing similar to that described later may be conducted to each of pieces of measurement information described in accordance with the disunified formats.

Next, with reference to FIG. 6, the extracted information referred to by the category information generating apparatus 501 will be described. FIG. 6 is a drawing conceptually illustrating an example of the extracted information referred to by the category information generating apparatus 501.

In the extracted information, an extraction item representing an item extracted from the measurement information 507, a condition of resource identifier for extracting the extraction item, and an extracted information identifier for uniquely identifying the extraction item. For example, in the extracted information exemplified in FIG. 6, the extracted information identifier "2", the condition "Pcap", and the extraction item "port number" are associated. This represents that the extracted information identifier "2" indicates processing for extracting the extraction item "port number" based on the measured value associated with the resource identifier "Pcap" in the measurement information 507 exemplified in FIG. 5.

In the extracted information exemplified in FIG. 6, the extracted information identifier "4," the condition "*" (asterisk) and the extraction item "AS number" are associated. The sign "*" represents that a condition of the resource identifier is not specified. This represents that the extracted information identifier "4" indicates processing for extracting the extraction item "AS number" from all measured values included in the measurement information 507 exemplified in FIG. 5. "AS" represents the abbreviation of Autonomous System. The AS number is an apparatus identifier of a communication-relaying apparatus in communication processing.

A searching apparatus according to the second example embodiment conducts search processing for a request including extraction items in extracted information stored in the extracting information storage 506. The extracted information is not limited to the extracted information illustrated in FIG. 6.

Figure 2:
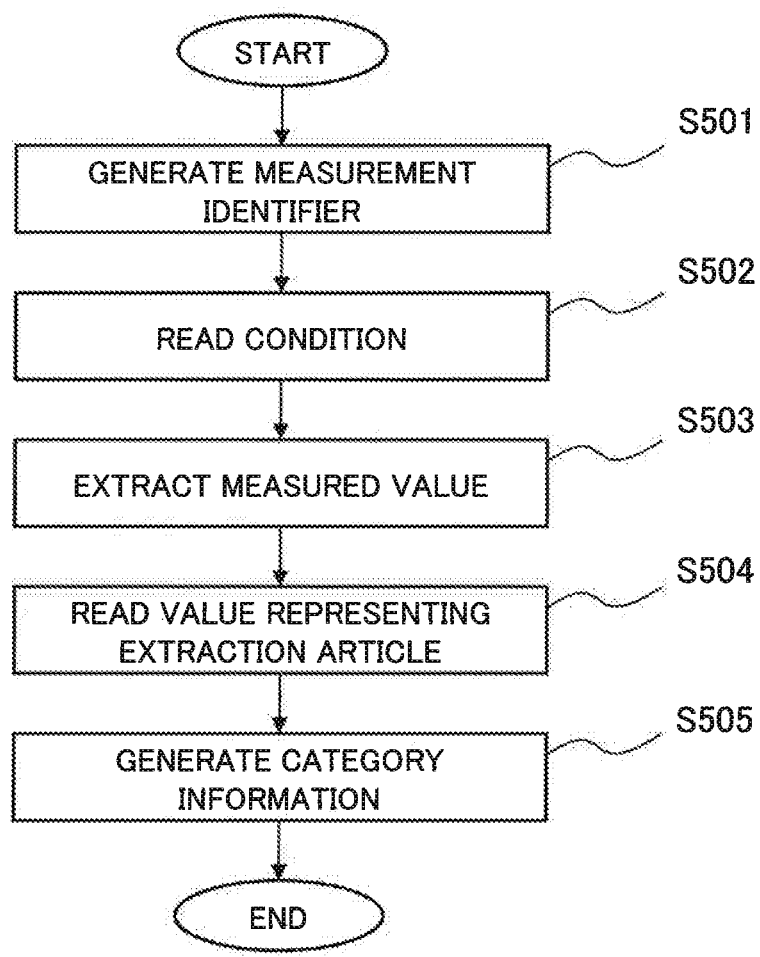
FIG. 2 is a flowchart illustrating flows of processing in the category information generating apparatus according to the first example embodiment.

Next, with reference to FIG. 2, processing of the category information generating apparatus 501 according to the first example embodiment of the present invention will be described in details. FIG. 2 is a flowchart illustrating flows of processing in the category information generating apparatus 501 according to the first example embodiment.

First, the identifier generating unit 502 generates a measurement identifier for uniquely identifying a measured value included in the measurement information 507 (exemplified in FIG. 5) with respect to communication via a communication network (step S501). For example, the identifier generating unit 502 assigns a natural number to a measured value included in the measurement information 507 as the measurement identifier of the measured value included in the measurement information 507.

Next, the extracting unit 503 reads a certain condition, an extraction item associated with the certain condition, and an extracted information identifier associated with the certain condition from the extracted information exemplified in FIG. 6 (step S502). The extracting unit 503 refers to the measurement information 507 and extracts a measured value associated with the resource identifier (represented as "particular measured value") when the resource identifier satisfies the certain condition in the measurement information 507 exemplified in FIG. 5.

In the process at step S502, the extracting unit 503 reads, for example, information associating the extracted information identifier "3", the condition "Apache" (above-described "certain condition"), and the extraction item "measured value" from the extracted information exemplified in FIG. 6. The extracting unit 503 refers to the measurement information 507 exemplified in FIG. 5. When the resource identifier satisfies the read condition "Apache", the extracting unit 503 extracts measured values "1.2.3.4 . . . " associated with the resource identifier. The extracting unit 503 refers to the measurement information 507 exemplified in FIG. 5 and extracts measured values "1.2.5.6 . . . " when the resource identifier satisfies the read condition "Apache".

The reading unit 504 reads a value representing the extraction item read by the extracting unit 503 at step S502 from the particular measured value extracted by the extracting unit 503 at step S503 (step S504).

In an example of the measurement information 507 depicted in FIG. 5, the reading unit 504 reads at step S504, measured values "1.2.3.4 . . . " as the extraction item associated with the condition "Apache".

The category information generating unit 505 generates category information where a measurement identifier of the particular measured value (generated by the identifier generating unit 502 at step S501), the extracted information identifier read by the extracting unit 503, and the value read by the extracting unit 503 are associated (step S505). When the identifier generating unit 502 assigns a natural number to the measurement information 507 exemplified in FIG. 5 as measurement identifiers, for example, the reading unit 504 generates category information where the measurement identifier "1" of measured value "1.2.3.4 . . . ", the extracted information identifier "3", and the measured value "1.2.3.4 . . . " (FIG. 7, described later) are associated. Further, the category information generating unit 505 may generate the category information where the measurement identifier "3" of measured value "1.2.5.6 . . . ", the extracted information identifier "3", and the measured value "1.2.5.6 . . . " are associated.

The category information generating apparatus 501 conducts processing of step S502 to step S505 illustrated in FIG. 2, to each information included in the extracted information. In this case, the category information generating apparatus 501 generates category information exemplified in FIG. 7. FIG. 7 is a drawing conceptually illustrating one example of category information generated by the category information generating apparatus 501.

With reference to FIG. 7, the category information associates the measurement identifier of the particular measured value extracted by the extracting unit 503, the extracted information identifier read by the extracting unit 503 at step S502, and a value of the extraction item read by the reading unit 504 with respect to the extraction item. For example, in the category information exemplified in FIG. 7, the measurement identifier "1", the extracted information identifier "3", and values "1.2.3.4 . . . " are associated. This represents that the reading unit 504 reads values "1.2.3.4 . . . " as values of the extraction item associated with the extracted information identifier "3" in accordance with the condition identified by the extracted information identifier "3" with respect to the measurement information 507 identified by the measurement identifier "1".

Next, effects of the category information generating apparatus 501 according to the first example embodiment will be described.

According to the category information generating apparatus 501 of the present example embodiment, it is possible to conduct the high-speed search processing to log information. This is because the category information generated by the category information generating apparatus 501 (FIG. 7) is suitable for the use application for the high-speed search.

The reason why the category information generated by the category information generating apparatus 501 is suitable for the use application for the high-speed search will be described.

For example, even if the log summation support apparatus disclosed in PTL 3 is used, desirable information with respect to communication is not necessarily effectively extracted. This is because processing on the certain search condition need to be executed again at each time of receiving requests even when the requests commonly includes a certain search condition. In other words, the processing on the certain search condition are repeatedly executed at each time of receiving requests.

The category information generating apparatus 501 according to the present example embodiment generates the category information where the measurement identifier of measurement information 507 (exemplified in FIG. 5), the extracted information identifier of the extraction item (exemplified in FIG. 6) and the value extracted by the reading unit 504 (exemplified in FIG. 7) are associated. In other words, the category information generated by the category information generating apparatus 501 is information in which pieces of the measurement information 507 are classified with respect to the extraction item included in the extracted information. Therefore, processing for searching the category information by using a certain request includes processing for determining whether or not an extracted information identifier of the extraction item in the certain request matches an extracted information identifier included in the category information. In the search processing in accordance with the request including the extraction item described with reference to FIG. 6, the category information generating apparatus 501 according to the present example embodiment conducts search processing on the category information obtained by the classification of the measurement information 507 as a search target. As a result, the search processing with respect to a certain search condition has been completed. Therefore, even when the plurality of requests commonly including the certain condition is received, the search processing with respect to the certain search condition does not repeat.

Second Example Embodiment

Next, a second example embodiment of the present invention based on the above-described first example embodiment will be described.

In the following descriptions, characteristic portions of the present example embodiment will be mainly described, and a configuration identical with that of the above-described first example embodiment will be denoted with an identical reference numeral to omit the duplicated descriptions.

Figure 8:
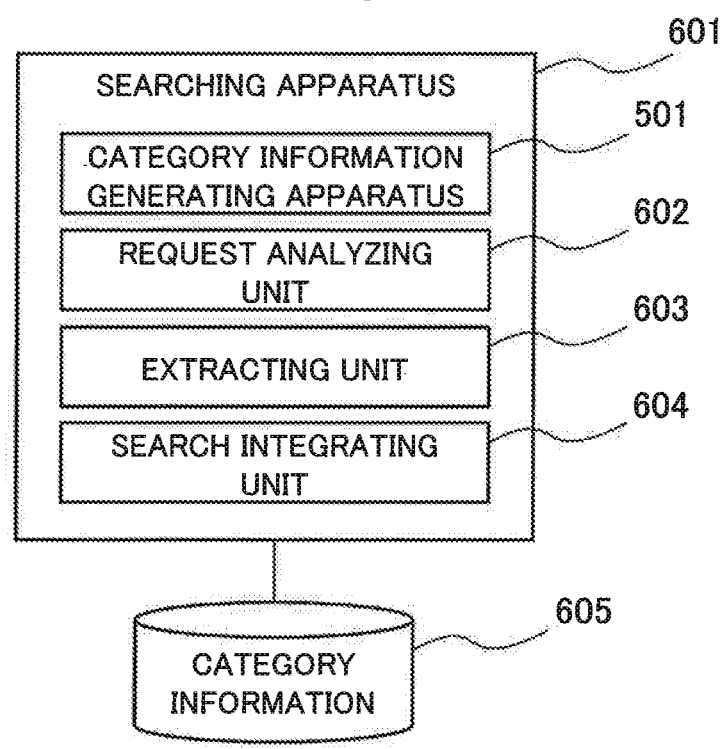
FIG. 8 is a block diagram illustrating a configuration of a searching apparatus according to a second example embodiment of the present invention.

With reference to FIG. 8, a configuration of a searching apparatus 601 according to the second example embodiment of the present invention will be described in details. FIG. 8 is a block diagram illustrating a configuration of the searching apparatus 601 according to the second example embodiment of the present invention.

The searching apparatus 601 according to the second example embodiment includes the category information generating apparatus 501, a request analyzing unit (request analyzer) 602, an extracting unit (extractor) 603, and an search integrating unit (search integrator) 604. The searching apparatus 601 can refer to category information 605 generated by the category information generating apparatus 501 (exemplified in FIG. 7).

Figure 9:
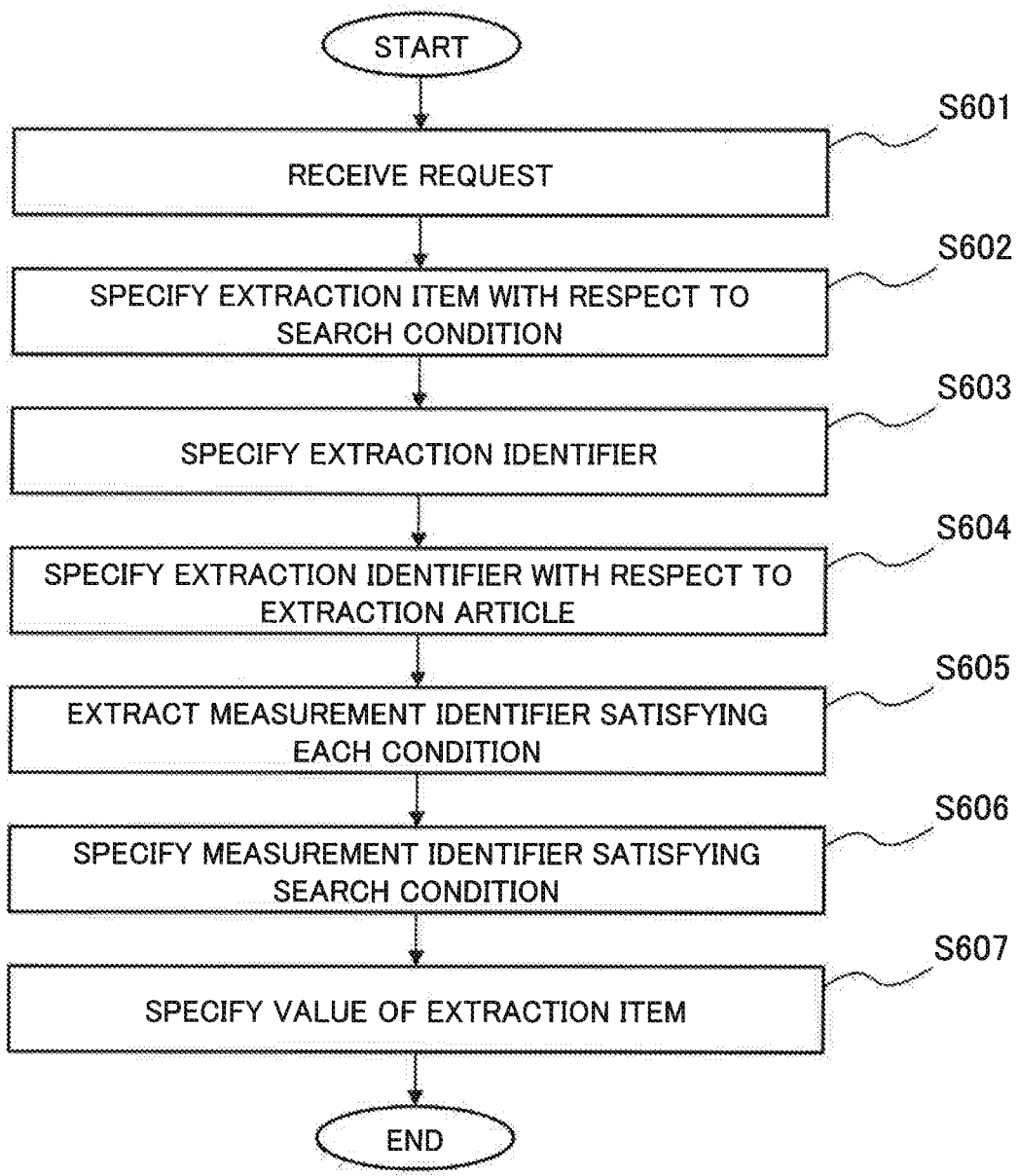
FIG. 9 is a flowchart illustrating flows of processing of the searching apparatus according to the second example embodiment.

Next, with reference to FIG. 9, processing of the searching apparatus 601 according to the second example embodiment of the present invention will be described in details. FIG. 9 is a flowchart illustrating flows of processing of the searching apparatus 601 according to the second example embodiment.

It is assumed that the category information generating apparatus 501 generates in advance the category information 605 as exemplified in FIG. 7.

The request analyzing unit 602 receives a request where a certain search condition and an extraction item representing an item extracted from data satisfying the certain search condition (step S601).

For example, the request is a signal for requiring the AS number gone through in a communication which is conducted within one week in accordance with the HTTP protocol and is conducted for requiring information relating to the certain particular address. In this case, in the certain search condition, the following condition A to the condition C are combined.

The condition A: Whether or not a time of the conducted communication is within one week, The condition B: Whether or not resources conduct the communication in accordance with the HTTP protocol The condition C: Whether or not the communication is a communication for requiring information relating to the certain particular address.

In a case of a request in which the above-described condition A to condition C are combined, the extraction item is an apparatus identifier (AS number) of an apparatus gone through when the communication satisfying the certain search condition is conducted. In this example, the request analyzing unit 602 obtains the condition A, the condition B, the condition C, and the extraction item "AS number" from the received request.

The request analyzing unit 602 refers to the extracted information as exemplified in FIG. 6 and specifies the extraction item matching the condition with respect to individual condition included in the search condition within the received request (step S602).

The condition A is a condition with respect to time of the communication. The request analyzing unit 602 specifies the extraction item matching the "time" to be a target for the condition A by referring to the extracted information (exemplified in FIG. 6). In this case, the request analyzing unit 602 specifies the extraction item "time" as the extraction item matching the condition A.

The condition B is a condition with respect to the resource identifier in the communication. The request analyzing unit 602 specifies the extraction item matching the "resource identifier" to be a target for the condition B by referring to the extracted information (exemplified in FIG. 6). In this case, the request analyzing unit 602 specifies the extraction item "resource identifier" as the extraction item matching the condition B.

The condition C is a condition with respect to an address. In this case, the request analyzing unit 602 specifies the extraction item matching the "address" to be a target for the condition C by referring to the extracted information (exemplified in FIG. 6). In this case, the request analyzing unit 602 specifies the extraction item "address" as the extraction item matching the condition C.

Next, the request analyzing unit 602 specifies the extracted information identifier associated with the specified extraction item by referring to the extracted information (step S603).

For example, the request analyzing unit 602 refers to the extracted information as exemplified in FIG. 6 and specifies the extracted information identifier "5" associated with the specified extraction item "time" with respect to the condition A. The request analyzing unit 602, refers to the extracted information and specifies the extracted information identifier "1" associated with the specified extraction item "resource identifier" with respect to the condition B. The request analyzing unit 602 refers to the extracted information and specifies the extracted information identifier "6" associated with the specified extraction item "address" with respect to the condition C.

Further, the request analyzing unit 602 refers to the extracted information as exemplified in FIG. 6 and specifies the extracted information identifier associated with the extraction item within the received request (step S604). For example, the request analyzing unit 602 specifies the extracted information identifier "4" associated with the extraction item "AS number" with respect to the received request.

Next, the request analyzing unit 602 generates search information where the extracted information identifier specified with respect to an individual condition and a request included in the condition are associated (exemplified in FIG. 10). FIG. 10 is a drawing conceptually illustrating one example of the search information.

In the search information exemplified in FIG. 10, the extracted information identifier "5" and the condition "within one week" are associated. This represents a condition for determining whether or not a value of the extraction item extracted with respect to the extracted information identifier "5" satisfies the condition "within one week." Further, in the search information, the extracted information identifier "1" and the condition "Apache" are associated. This represents a condition for determining whether or not a value of the extraction item extracted with respect to the extracted information identifier "1" satisfies the condition "Apache".

Search information is not limited to the search information exemplified in FIG. 10.

Next, the extracting unit 603 refers to the category information 605 and extracts the measurement identifier satisfying the search information generated by the request analyzing unit 602 (i.e., individual condition in search condition within request) (step S605).

For example, the extracting unit 603 reads a value of the extraction item and a measurement identifier associated with the extracted information identifier "5" in the category information 605 exemplified in FIG. 7 with respect to the condition A (i.e., line one of FIG. 10) and determines whether or not the read value satisfies the condition "within one week" (i.e., condition A). When a value of the extraction item is within one week, the extracting unit 603 extracts the read measurement identifier. When a value of the extraction item is not within one week, the extracting unit 603 does not extract the read measurement identifier.

The extracting unit 603 reads a value of the extraction item and a measurement identifier associated with the extracted information identifier "1" in the category information 605 exemplified in FIG. 7 with respect to the condition B (i.e., line two of FIG. 10), and determines whether or not the read value satisfies the condition "Apache" (i.e., condition B). When a value of the extraction item is "Apache," the extracting unit 603 extracts the read measurement identifier. When the value of the extraction item is not the "Apache", the extracting unit 603 does not extract the read measurement identifier.

For the condition C, the extracting unit 603 conducts processing similar to that executed for the condition A or the condition B.

Next, the search integrating unit 604 specifies the measurement identifier satisfying the search condition among the measurement identifiers extracted by the extracting unit 603 with respect to individual condition within the search condition (step S606).

Hereinafter, step S606 will be specifically described by taking the above-described example. Since the condition A, the condition B, and the condition C are coupled via the AND operation in the search condition received by the request analyzing unit 602, the search integrating unit 604 obtains the measurement identifier included in the measurement identifier extracted by the extracting unit 603 in common with respect to each condition. When the condition A, the condition B, and the condition C are coupled via the OR operation in the search conditions received by the request analyzing unit 602, the search integrating unit 604 obtains the measurement identifier included in any of measurement identifier extracted by the extracting unit 603 with respect to each condition.

Next, the search integrating unit 604 refers to the category information 605 illustrated in FIG. 7 and specifies a value of the extraction item associated with both the obtained measurement identifier and the extracted information identifier specified by the request analyzing unit 602 with respect to the extraction item at step S604 (step S607). The search integrating unit 604 may output the specified value of the extraction item. In other words, the search integrating unit 604 can specify the value of the extraction item to be extracted with respect to the measurement identifier satisfying the search condition by executing the process in step S607.

Next, effects of the searching apparatus 601 according to the second example embodiment will be described.

The searching apparatus 601 according to the present example embodiment enables high-speed search processing to log information of the communication or the like. This is because a configuration of the searching apparatus 601 according to the second example embodiment includes a configuration of the category information generating apparatus 501 according to the first example embodiment.

Further, the searching apparatus 601 according to the present example embodiment can execute high-speed search processing to the log information of the communication or the like. This is because the pieces of measurement information 507 are classified as the category information in accordance with describable conditions as an element of the search condition in search processing based on the received request.

The searching apparatus 601 according to the present example embodiment achieves an effect of not causing the redundant storage area even if a normalization processing is conducted to the measurement information while enabling an efficient search. For example, when the normalization process is conducted on the measured values among pieces of measurement information exemplified in FIG. 5, a null value may appear to an item which is not common to a plurality of measured values after the normalization process. On the other hand, the above-described null value is unlikely to appear with respect to the category information 605 (exemplified in FIG. 7) generated by the searching apparatus 601 since the extraction item focused in advance is generated based on the stored extracted information (exemplified in FIG. 6).

In each example embodiment of the present invention described above, by referring to example of the communications conducted in accordance with the HTTP protocol, processing of the searching apparatus 601, the processing of the category information generating apparatus 501 and the like have been described. However, apparatus in each example embodiment of the present invention described above are not limited to the communications conducted in accordance with the HTTP protocol.

(Hardware Configuration Example)

A configuration example of hardware resources that realize category information generating apparatus or a searching apparatus in each example embodiment of the present invention by using a single calculation processing apparatus (an information processing apparatus or a computer) will be described. However, the category information generating apparatus or the searching apparatus may be realized using physically or functionally at least two calculation processing apparatuses. Further, the category information generating apparatus or the searching apparatus may be realized as a dedicated apparatus.

FIG. 11 is a block diagram schematically illustrating a hardware configuration of a calculation processing apparatus capable of realizing the category information generating apparatus according to the first example embodiment or the searching apparatus according to the second example embodiment. A calculation processing apparatus 20 includes a central processing unit (CPU) 21, a memory 22, a disc 23, and a non-transitory recording medium 24. A calculation processing apparatus 20 further includes an input apparatus 25, an output apparatus 26, a communication interface (hereinafter, expressed as a "communication I/F") 27 and a display 28. The calculation processing apparatus 20 can execute transmission/reception of information to/from another calculation processing apparatus and a communication apparatus via the communication I/F 27.

The non-transitory recording medium 24 is, for example, a computer-readable Compact Disc, Digital Versatile Disc. The non-transitory recording medium 24 may be Universal Serial Bus (USB) memory, Solid State Drive or the like. The non-transitory recording medium 24 allows a related program to be holdable and portable without power supply. The non-transitory recording medium 24 is not limited to the above-described media. Further, a related program can be carried via a communication network by way of the communication I/F 27 instead of the non-transitory recording medium 24.

In other words, the CPU 21 copies, on the memory 22, a software program (a computer program: hereinafter, referred to simply as a "program") stored by the disc 23 when executing the program and executes arithmetic processing. The CPU 21 reads data necessary for program execution from the memory 22. When display is needed, the CPU 21 displays an output result on the display 28. When a program is input from the outside, the CPU 21 reads the program from the input apparatus 25. The CPU 21 interprets and executes an category information generating program (FIG. 2) or a searching program (FIG. 9) present on the memory 22 corresponding to a function (processing) indicated by each unit illustrated in FIG. 1 or FIG. 8 described above. The CPU 21 sequentially executes the processing described in each example embodiment of the present invention.

In other words, in such a case, it is conceivable that the present invention can also be made using the category information generating program or the searching program. Further, it is conceivable that the present invention can also be made using a computer-readable, non-transitory recording medium storing the category information generating program or the searching program.

The present invention has been described using the above-described example embodiments as example cases. However, the present invention is not limited to the above-described example embodiments. In other words, the present invention is applicable with various aspects that can be understood by those skilled in the art without departing from the scope of the present invention.

This application is based upon and claims the benefit of priority from Japanese patent application No. 2015-178306, filed on Sep. 10, 2015, the disclosure of which is incorporated herein in its entirety.

REFERENCE SIGNS LIST

501 Category information generating apparatus
502 Identifier generating unit 503 Extracting unit
504 Reading unit
505 Category information generating unit
506 Extracting information storage
507 Measurement information
601 Searching apparatus
602 Request analyzing unit
603 Extracting unit
604 Search integrating unit
605 Category information
20 Calculation processing apparatus
21 CPU
22 Memory
23 Disk
24 Non-transitory recording medium
25 Input apparatus
26 Output apparatus
27 Communication IF
28 Display

The invention claimed is:

1. A searching apparatus comprising:
a memory for storing instructions and extraction information that associates an extraction information identifier, a condition of a resource identifier, and an extraction item representing an item to be extracted; and
a processor connected to the memory and configured to execute the instructions to:
generate, with respect to measurement information, a measurement identifier of a measurement value, the measurement information associating the measurement value measured with respect to communication via a communication network with a resource identifier of each of a plurality of apparatuses generating the measurement value;
read the extraction information identifier, the condition of the resource identifier, and the extraction item from the extraction information;
extract a particular measurement value associated with a resource identifier satisfying the read condition of the resource identifier in the measurement information;
read a value representing an extraction item in the extraction information from the extracted particular measurement value;
generate category information that associates a measurement identifier representing the extracted particular measurement value, the extraction information identifier in the extraction information, and the read value with each other; and
determine whether or not an extraction information identifier of the extraction item in a certain request matches an extraction information identifier included in the generated category information and, thereby, conduct a search process for the certain request.

2. The searching apparatus according to claim 1, wherein the extraction item in the extraction information includes a port identifier.

3. The searching apparatus according to claim 1, wherein the extraction item in the extraction information includes an apparatus identifier of a transit apparatus in communication.

4. The searching apparatus according to claim 1, wherein the extraction item in the extraction information includes an apparatus identifier of an apparatus generating the measurement value.

5. The searching apparatus according to claim 1, wherein the processor is configured to execute the instructions to:
specify, with respect to a request where a search condition described using a first extraction item included in the extraction information and a second extraction item included in the extraction information are associated with each other, a first extraction information identifier associated with the first extraction item and a second extraction information identifier associated with the second extraction item and generating search information where a requirement in the search condition and the specified first extraction information identifier are associated with each other;
specify the measurement value associated with the first extraction information identifier in the category information and specifying, when the specified measurement value satisfies the requirement associated with the first extraction information identifier in the search information, the measurement identifier associated with the first extraction information identifier in the category information; and
obtain a measurement identifier that satisfies the search condition among the measurement identifiers specified by the extractor.

6. A searching method by a computer that includes a memory for storing extraction information that associates an extraction information identifier, a condition of a resource identifier, and an extraction item representing an item to be extracted comprising:
generating, with respect to measurement information, a measurement identifier of a measurement value, the measurement information associating the measurement value measured with respect to communication via a communication network with a resource identifier of each of a plurality of apparatuses generating the measurement value;
reading the extraction information identifier, the condition of the resource identifier, and the extraction item from the extraction information;
extracting a particular measurement value associated with a resource identifier satisfying the read condition of the resource identifier in the measurement information;
reading a value representing an extraction item in the extraction information from the extracted particular measurement value;
generating category information that associates a measurement identifier representing the extracted particular measurement value, the extraction information identifier in the extraction information, and the read value with each other; and
determining whether or not an extraction information identifier of the extraction item in a certain request matches an extraction information identifier included in the generated category information and, thereby, conducting a search process for the certain request.

7. The searching method according to claim 6, further comprising:
specifying, with respect to a request where a search condition described using a first extraction item included in the extraction information and a second extraction item included in the extraction information are associated with each other, a first extraction information identifier associated with the first extraction item and a second extraction information identifier associated with the second extraction item and generating search information where a requirement in the search condition and the specified first extraction information identifier are associated with each other;
specifying the measurement value associated with the first extraction information identifier in the category information and specifying, when the specified measurement value satisfies the requirement associated with the first extraction information identifier in the search information, the measurement identifier associated with the first extraction information identifier in the category information; and obtaining a measurement identifier that satisfies the search condition among the specified measurement identifiers.

8. A non-transitory recording medium storing a searching program recorded therein, the program making a computer that includes a memory for storing extraction information that associates an extraction information identifier, a condition of a resource identifier, and an extraction item representing an item to be extracted achieve:

an identifier generating function configured to generate, with respect to measurement information, a measurement identifier of a measurement value, the measurement information associating the measurement value measured with respect to communication via a communication network with a resource identifier of each of a plurality of apparatuses generating the measurement value;

a function configured to read the extraction information identifier, the condition of the resource identifier, and the extraction item from the extraction information;

an extracting function configured to extract a particular measurement value associated with a resource identifier satisfying the read condition of the resource identifier in the measurement information;

a reading function configured to read a value representing an extraction item in the extraction information from the extracted particular measurement value;

a category information generating function configured to generate category information that associates a measurement identifier representing the extracted particular measurement value, the extraction information identifier in the extraction information, and the value read in the reading function with each other; and a function configured to determine whether or not an extraction information identifier of the extraction item in a certain request matches an extraction information identifier included in the generated category information and, thereby, conduct a search process for the certain request.

9. The non-transitory recording medium storing the searching program according to claim 8,
wherein
the extraction item in the extraction information includes a communication port identifier.

10. The non-transitory recording medium storing the searching program according to claim 8 recorded therein, the program making a computer achieve:

a request analyzing function configured to specify, with respect to a request where a search condition described using a first extraction item included in the extraction information and a second extraction item included in the extraction information are associated with each other, a first extraction information identifier associated with the first extraction item and a second extraction information identifier associated with the second extraction item and generating search information where a requirement in the search condition and the specified first extraction information identifier are associated with each other;

a second extracting function configured to specify the measurement value associated with the first extraction information identifier in the category information and specifying, when the specified measurement value satisfies the requirement associated with the first extraction information identifier in the search information, the measurement identifier associated with the first extraction information identifier in the category information; and a search integrating function configured to obtain a measurement identifier that satisfies the search condition among the measurement identifiers specified in the extracting function.

\* \* \* \* \*